Jan. 13, 1953 — M. A. ROBERTSON ET AL — 2,625,179

FLOW CHOKE

Filed Aug. 13, 1946

MARION A. ROBERTSON
JAMES C. SANDERS
*INVENTORS.*

BY  Lester B. Clark
     Ray L. Smith

ATTORNEYS

Patented Jan. 13, 1953

2,625,179

UNITED STATES PATENT OFFICE 2,625,179

FLOW CHOKE

Marion A. Robertson and James C. Sanders, Alvin, Tex.

Application August 13, 1946, Serial No. 690,281

7 Claims. (Cl. 138—44)

The invention relates to a reducing flow choke to be positioned in a fluid conducting line and more particularly to a choke for use in the control and measuring of the flow of oil and gas wells.

An object of the invention is to provide a device for insertion in a flow line wherein the choke member may be slidably inserted or removed and is retained in position by the application of liquid pressure thereto.

Another object of the invention is to provide a means to keep an accurate gauge on the flow of liquid from a well.

Another object of the invention is to provide such a device for insertion in the flow line of a well so that the insertion of a new choke assembly therein may be readily accomplished.

A still further object of the invention is to provide a choke device wherein the choke member is retained in position by liquid pressure thereon.

Another object of the invention is to provide a device for insertion in a fluid line for the control of wells whereby the choke member is sealed into position by the application of the liquid pressure thereto.

Other objects and advantages of the invention will become apparent from a consideration of the following description and drawing, wherein.

Figure 1:
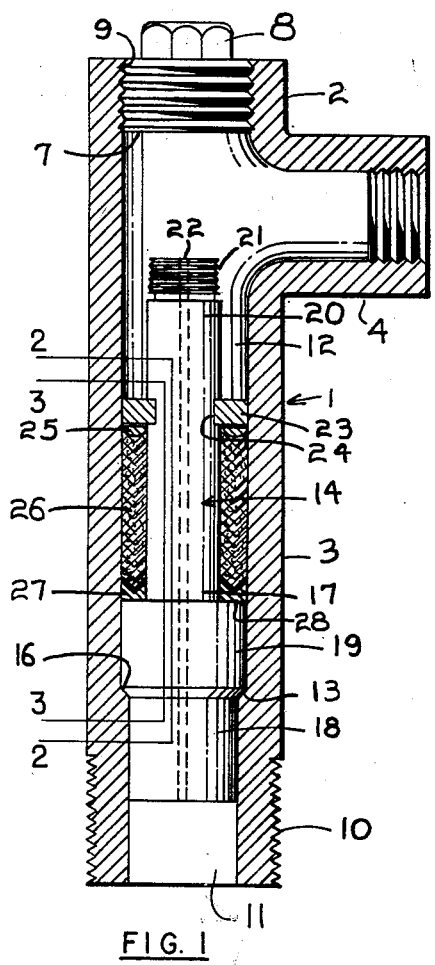
Fig. 1 is a vertical sectional view of an embodiment of the device showing a choke member in elevation placed in the device ready to be inserted in a flow line.

In Fig. 1 the device is denoted generally as having a housing 1 and is shown assembled ready for insertion into the flow line. The housing 1 is shown as being in the shape of a T having arms 2 and 3 extending outwardly from the base 4 of the T.

The base 4 has suitable means such as threads 6 for connection of the device to the flow line (not shown) to receive liquid therefrom. Arm 2 of the T has opening 7 therethrough normally closed by suitable means such as plug 8 threaded into the end 9 thereof.

The arm 3 of the T is connected by suitable means such as threads 10 to the discharge line (not shown) for the discharge of fluid from the outlet bore or passage 11 in the arm 3. The interior of the arm 3 is shown as having an inlet bore 12 axially aligned with outlet bore 11 and connected therewith by inwardly annular tapered surface or seat 13 on the inner periphery thereof so that outlet bore 11 is of smaller diameter than inlet bore 12.

Figure 4:
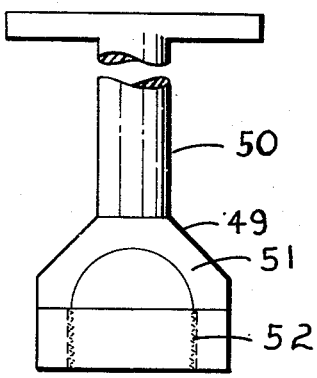
Fig. 4 represents a form of a tool for insertion and withdrawal of the removable choke assembly.

A choke assembly 14 slidably fits within the bore 12 and upon the seat 13 therein. This assembly comprises a choke body 17 which is shown as having an enlarged portion 19 fitting closely within the passage above the shoulder 13 in the housing 1, such enlargement having downwardly facing shoulder 16 complementary to the shoulder 13. A downward extension 18 on the choke body slidably fits within the reduced bore 11 below the shoulder 13. The upper portion 20 of the body 17 is reduced in cross section and terminates in suitable means such as threads 21 at its upper end for engagement with a tool such as shown in Fig. 4 to effect removal of the assembly as will be more fully described hereinafter. The passage 22 extends axially through the body 14 and serves to provide desired choking action on the flow of well fluid within the device.

A snap ring 23 is positioned in the groove 24 on reduced portion 20 of the body 17 and cooperates with the male adapter ring 25 to position the packing 26 around such portion. The female adapter ring 27 rests upon shoulder 28 of the body and provides the nether support for the packing 26. The packing 26 is preferably of the chevron type as shown so that fluid pressure tending to hold the choke assembly 14 upon the seat 13 will also form a seal between the reduced portion 20 and inner periphery of arm 3.

Figures 2, 3:
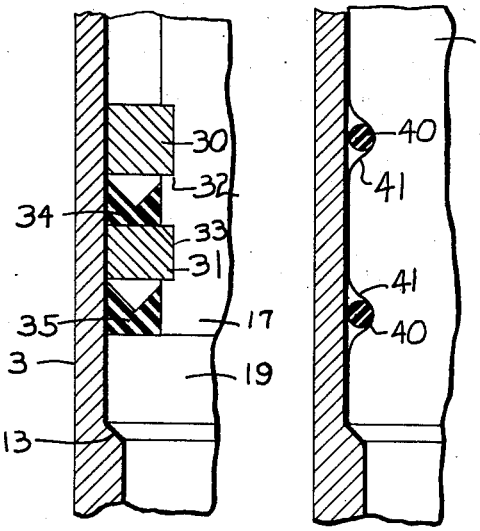
Fig. 2 and Fig. 3 are sectional views taken on the line 2—2 and 3—3 of Fig. 1 showing alternate embodiments of the device.

In Fig. 2 an alternate form of packing means is represented as having snap rings 30 and 31 positioned in grooves 32 and 33 of the choke body 17. Lipped seals 34 and 35 between snap rings 30 and 31 and on the periphery of choke body 17 effect a seal between the arm 3 and choke body 17 upon application of liquid pressure to the assembly.

In Fig. 3, the enlarged portion 19 is shown as extending upwardly the full length of elongated portion 20. Seal members such as O-rings 40 are placed in grooves 41 to effect a seal with the arm 3 upon application of liquid pressure to the assembly.

A tool 49 such as shown in Fig. 4, having a rod 50 with head 51 thereon and internally threaded at 52 for engagement with threads 21 on the end of choke portion 20 serve for removal or replacement of the choke assembly from the housing 1.

In operation, the base 4 of the housing 1 is placed on a flow line from the well and arm 3 is connected to a conduit leading to a point of delivery of the well fluid. Fluid from the well enters the device through base 4 and exerts a pressure downwardly against the choke assembly 14 and also against the packing 26 whereby an effective seal is provided between the choke assembly 14 and the inner periphery of arm 3. It seems apparent that this pressure also serves to hold the choke assembly firmly upon the shoulder 13.

When the choke assembly 14 becomes worn or if it is desired to replace the choke body 17 with one having a bore of a different size, the plug 8 may be removed and tool 49 inserted through opening or replacement aperture 7 to engage the end of the choke body 17 and withdraw the whole assembly from the housing through replacement aperture 7. The new choke assembly is then inserted through the aperture and positioned in the housing. The device is then ready for operation.

In this manner the choke assembly may be replaced in a simple manner and by means of a simple and effective tool without removal of the whole device from the flow line.

Operations with alternate forms shown in Figs. 2 and 3 are similar to that previously described.

Broadly the invention contemplates a flow choke for the control and measurement of fluid, such device so constructed and arranged that the choke assembly thereof may be replaced or removed without disconnecting the device from the flow line and the retention of the choke body in position in the device is effected by liquid pressure thereon.

What is claimed is:

1. A flow choke comprising a housing having a passage therethrough and a replacement aperture communicating with said passage, a shoulder in said passage, a choke assembly slidably fitting within the passage and seated upon said shoulder, said assembly comprising an enlarged choke body, a reduced portion extending downstream from said body and a reduced portion extending upstream from said body and having a restricted bore therethrough and seal means surrounding said choke body and operable by fluid admitted to the passage to form a seal between said bodies.

2. A flow choke comprising a housing having a passage therethrough and a replacement aperture communicating with said passage, a shoulder in said passage, a choke assembly slidably fitting within the passage and seated upon said shoulder, said assembly comprising an enlarged choke body, a reduced portion extending downstream from said body and a reduced portion extending upstream from said body and having a restricted bore therethrough, seal means surrounding said reduced portion extending upstream and operable by fluid admitted to the passage to form a seal between said upstream reduced portion and said passage, said replacement aperture being aligned with at least a portion of the passage and said shoulder for insertion and withdrawal of the choke assembly to and from the passage.

3. A flow choke comprising a housing having a passage therethrough and a replacement aperture communicating with said passage and in alignment with a portion thereof, a shoulder in said passage and facing said replacement aperture, a choke assembly slidably fitting within the passage and seated upon said shoulder, said assembly comprising an enlarged body, a reduced portion extending downstream from said body and a reduced portion extending upstream from said body with a bore therethrough, and seal means around said reduced portion extending upstream operable by fluid pressure to retain said choke assembly in seating position on said shoulder.

4. A flow choke comprising a housing having a passage therethrough and a replacement aperture communicating with said passage and in alignment with a portion thereof, a shoulder in said passage and facing said replacement aperture, a choke assembly slidably fitting within the passage and seated upon said shoulder, said assembly comprising a body, a reduced portion extending downstream from said body and a reduced portion extending upstream from said body with a bore therethrough, and seal means surrounding at least a part of said choke body operable by fluid pressure to retain said choke assembly in seating position on said shoulder, said replacement aperture being normally closed during the flow of fluid through said flow choke and removable for insertion and withdrawal of the choke assembly to and from the flow choke housing.

5. A flow choke assembly for insertion in a flow choke housing comprising, a choke body with a bore therethrough, said choke body being adapted to slidably fit in the housing, a shoulder on said body, a ring on the periphery of said body and spaced from said shoulder, and seal means around said body and positioned between said shoulder and said ring, said seal means operable by fluid pressure to retain said choke body in seating position on said shoulder.

6. A flow choke assembly for insertion in a flow choke housing comprising, a choke body with a bore therethrough, said choke body being adapted to slidably fit in the housing, a shoulder on said body, a series of spaced rings on the periphery of said body and spaced from said shoulder, and seal means around said body and positioned between said rings and said shoulder.

7. A flow choke comprising a housing having a fluid pressure inlet and an outlet, a passage between said inlet and outlet, a choke assembly positioned within said passage, said assembly including a body, a reduced portion extending downstream from said body and a reduced portion extending upstream from said body and having a restricted bore therethrough, and seal means interposed between the choke assembly and the housing and operable by fluid admitted through the inlet to form a seal therebetween.

MARION A. ROBERTSON.
JAMES C. SANDERS.

REFERENCES CITED

The following references are of record in the file of this patent:

UNITED STATES PATENTS

| Number | Name | Date |
|---|---|---|
| 630,047 | Gilbert | Aug. 1, 1899 |
| 1,031,992 | Ford | July 9, 1912 |
| 1,580,558 | McLaine | Apr. 13, 1926 |
| 2,046,579 | Penick et al. | July 7, 1936 |
| 2,294,499 | Henkell et al. | Sept. 1, 1942 |
| 2,407,951 | Daniel | Sept. 17, 1946 |
| 2,420,929 | Buffington et al. | May 20, 1947 |
| 2,433,973 | Anderson | Jan. 6, 1948 |